(12) United States Patent
Faye et al.

(10) Patent No.: US 7,150,445 B2
(45) Date of Patent: Dec. 19, 2006

(54) VALVE DEVICE HAVING A LONG ADJUSTMENT STROKE

(75) Inventors: Olivier Faye, Menilles (FR); Jean Luc Pattyn, Gaillon (FR); William Barre, Bouville (FR)

(73) Assignee: Snecma Moteurs, Paris (FR)

( * ) Notice: Subject to any disclaimer, the term of this patent is extended or adjusted under 35 U.S.C. 154(b) by 25 days.

(21) Appl. No.: 10/890,424

(22) Filed: Jul. 13, 2004

(65) Prior Publication Data
US 2005/0012061 A1 Jan. 20, 2005

(30) Foreign Application Priority Data
Jul. 17, 2003 (FR) .................................. 03 08714

(51) Int. Cl.
*F16K 31/02* (2006.01)
(52) U.S. Cl. ................... 251/129.11; 251/209; 251/309
(58) Field of Classification Search ................
251/129.11–129.13, 309–312, 207–209
See application file for complete search history.

(56) References Cited

U.S. PATENT DOCUMENTS 1,048,635 A * 12/1912 Allerding .................... 251/209
1,397,867 A * 11/1921 Jones ......................... 251/209
3,052,445 A    9/1962 Kessler
3,314,643 A    4/1967 Sachnik
3,379,408 A * 4/1968 Lowrey ..................... 251/298
3,409,270 A * 11/1968 Hulsey ........................ 251/209
4,846,213 A * 7/1989 Hutchens et al. ........... 137/241
4,989,833 A * 2/1991 Polon ......................... 251/209

FOREIGN PATENT DOCUMENTS

DE           951 789 C     10/1956
EP         0 524 589 A2     1/1993

* cited by examiner

*Primary Examiner*—J. Casimer Jacyna
(74) *Attorney, Agent, or Firm*—Weingarten, Schurgin, Gagnebin & Lebovici LLP

(57) ABSTRACT

The invention provides a control valve device enabling the positioning precision of its abutment to be reduced without reducing the overall control precision of the valve. For this purpose, the valve device comprises a valve body defining a fluid flow duct in which there is disposed a shutter element turned by an actuator by means of a drive shaft. The shutter element is formed by a skirt presenting a notch forming an opening in the wall of the skirt. The notch is shaped in such a manner as to define a variable flow passage in the duct as a function of the angular position of the shutter element between an open position in which the notch co-operates in full with the duct, and a closed position in which said skirt closes the duct.

14 Claims, 4 Drawing Sheets

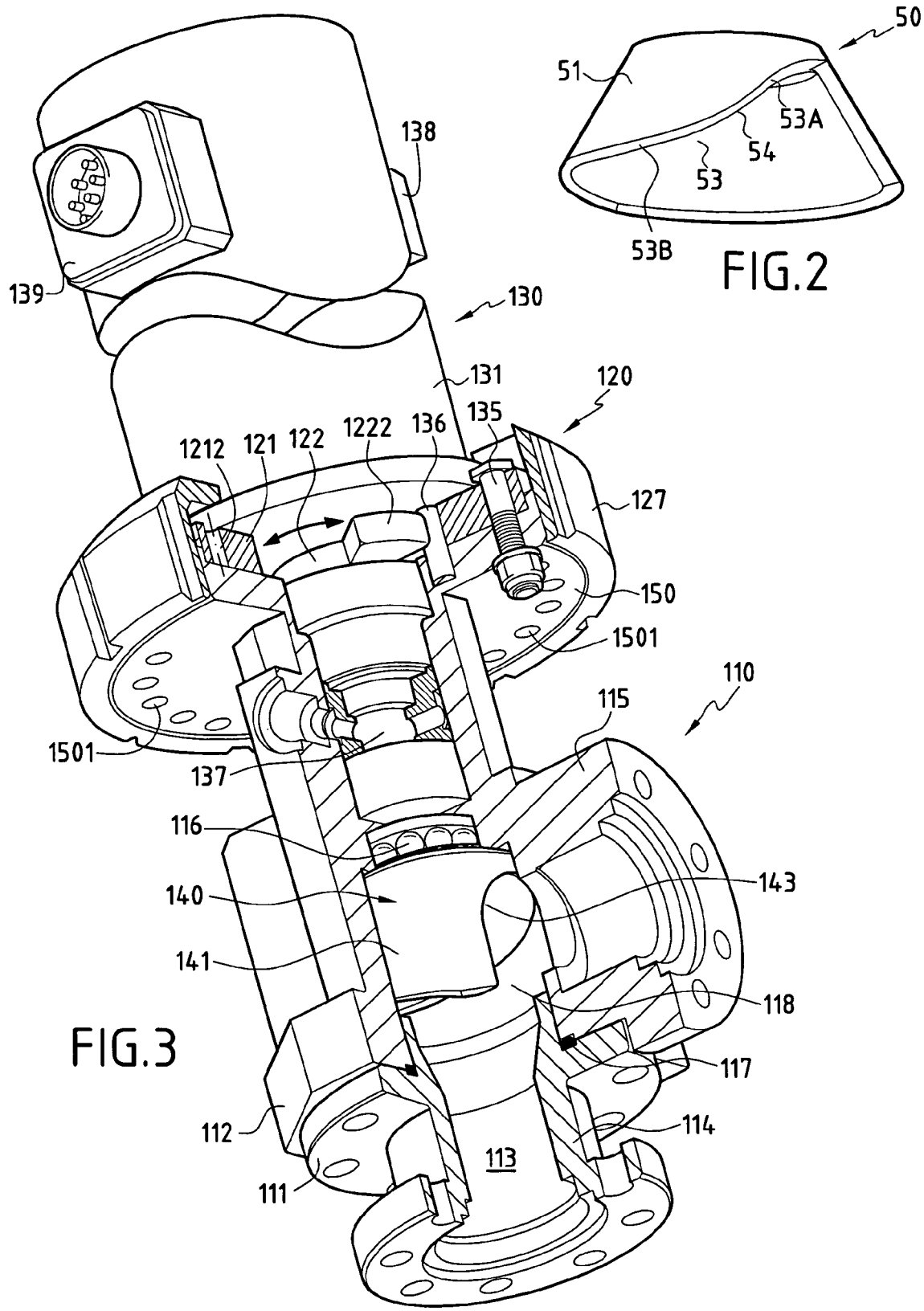

VALVE DEVICE HAVING A LONG ADJUSTMENT STROKE

This application claims priority to a French application No. 03 08714 filed Jul. 17, 2003.

FIELD OF THE INVENTION

The present invention relates to a valve device of the control valve type having a rotary shutter which enables head loss in a fluid flow circuit to be adjusted, e.g. a circuit for feeding cryogenic fluid as is used in a rocket engine. This type of valve is provided with a shutter element which, as a function of its position, varies head loss, and consequently varies the flow rate of fluid along a duct.

PRIOR ART

Control valves are control members that are essential for any motor or other device in which the action of a fluid is required. For example, in rocket engines, control valves control the power and internal parameters of the engine. The control performed in such engines by means of valves is to be both accurate and reliable, given the influence it has on the system as a whole. The present solution consists in driving stop or adjustment valves with so-called "proportional" actuators, i.e. actuators that operate via a specific control device to ensure compliance between a reference position and the real position of the actuator, and consequently of the valve. The valves used in that way are generally of the quarter-turn plug type, the butterfly type, or the slot type, and increasing the precision with which the valve can be adjusted, which has a direct influence on improving the performance of the engine, requires a corresponding increase in the precision with which the actuator can be positioned. This leads to an increase in the cost of the actuator, and of the processor system associated therewith for controlling positioning, with these costs increasing exponentially as a function of any increase in positioning precision. The extra cost is amplified to a great extent by the way in which the actuator is controlled which requires a local control loop that is faster and more accurate, and as is well known, that leads to very high expenditure for the electronics.

Thus, that type of solution rapidly reaches its limits relative to performance requirements which are nowadays becoming ever tighter in terms of development costs, and keep recurring concerning the improvement provided by the function.

OBJECT AND BRIEF SUMMARY OF THE INVENTION

The present invention seeks to remedy the above-mentioned drawbacks and to provide a control valve device that enables head loss to be controlled accurately while minimizing the cost induced by the actuator.

These objects are achieved by a control valve device comprising a valve body defining a fluid flow duct in which a shutter element is disposed that is turned by actuator means via a drive shaft, wherein the shutter element is formed by a skirt, said skirt presenting a notch forming an opening in the wall of the skirt, the notch being profiled so as to define a variable flow section in the duct as a function of the angular position of said shutter element between a closed position in which the skirt closes off the duct and an open position in which the skirt is fully retracted from the fluid flow duct so as to allow the fluid to flow freely in the duct.

Thus, a shutter element is provided that has a long adjustment stroke thus requiring much lower positioning precision for the actuator than is the case with present devices, but without reducing the precision with which the valve is controlled. The costs due to the actuator are therefore significantly reduced.

By means of the structure for the shutter element comprising a skirt with a notch, it is possible to ensure that the fluid flow stream in the duct is completely disengaged when the valve is in the open position, the shutter element then being completely retracted into a portion of the valve which lies outside the flow stream defined by the fluid flow duct. In other words, when the valve is in the open position, the shutter element is retracted completely from the duct so as to eliminate all obstacles in the flow duct and allow the fluid to flow freely without head losses or disturbances due to the presence of a portion of the shutter element in the flow. Consequently, the adjustment capacity of the valve is very large since it can adjust over a range extending from residual leakage past the shutter element when in the closed position, to the duct being fully disengaged when in the open position. The control valve of the present invention thus makes it possible to combine a large adjustment stroke while keeping the advantage of conventional valves having a rotary plug which can be considered as being a tube when in the open position.

The shape of the notch can be defined as a function of the desired head loss relationship and it can be linear or non-linear.

The skirt of the shutter element may be frustoconical or cylindrical in shape.

According to a characteristic of the invention, the notch presents a right profile which defines an opening that tapers until it meets the bottom end of the skirt. This makes it possible to obtain a slope for head loss variation that is practically linear with varying angle of the shutter element.

According to another characteristic of the invention, the notch presents a profile that is a function of the desired head loss relationship, which may then be non-linear.

The actuator includes at least an electric motor and gearbox unit whose outlet is coupled to the drive shaft.

For space applications, the actuator is preferably slow and irreversible. This presents the advantage of making it possible to allow all or part of a rocket engine to be controlled without requiring dedicated electronics or proportional flight controls.

For closed-loop operation, the actuator may also have a position sensor. To meet special requirements of reliability, the motor and/or the position sensor may be provided redundantly.

According to a particular aspect of the invention, the valve device includes an adjustable mechanical abutment system formed by a moving abutment secured to the drive shaft and a stationary abutment that is adjustable on the valve body.

More precisely, the stationary abutment comprises a ring having a stud, said ring being adjustable in position on a flange of the valve body.

The ring may include a first plurality of holes uniformly spaced apart at a first angular interval, and the flange of the valve body may include a second plurality of holes uniformly spaced apart at a second angular interval, the abutment being adjusted by locking the ring to the flange by means of a stop pin. The difference between the two angular intervals serves to define the adjustment resolution of the abutment. In order to make the abutment easier to adjust, the holes may be formed in the radial plane of the flange and the ring so as to enable the pin to be inserted from the side of the flange.

BRIEF DESCRIPTION OF THE DRAWINGS

Other characteristics and advantages of the invention appear from the following description of particular embodiments of the invention that are given as non-limiting examples, with reference to the accompanying drawings, in which:

FIG. 2 is a diagrammatic view of a variant embodiment of a shutter element of the invention;

FIG. 3 is a perspective view of a second embodiment of the valve device of the invention;

DETAILED DESCRIPTION OF EMBODIMENTS OF THE INVENTION

Figure 1:
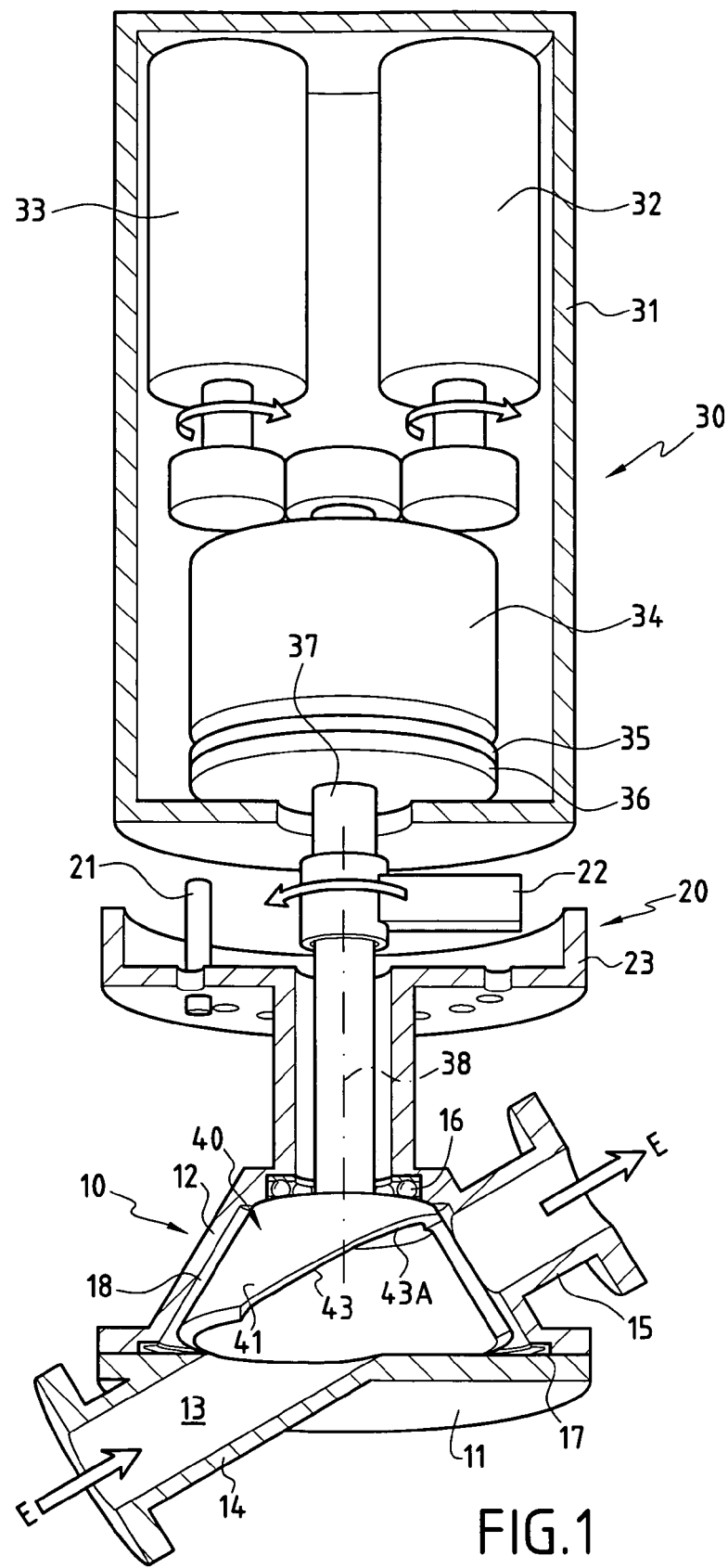
FIG. 1 is a diagrammatic longitudinal section view of a valve device constituting a first embodiment of the invention.

FIG. 1 shows a first embodiment of the invention comprising a control valve device comprising a valve body 10 formed by a bottom body 11 and a top body 12 interconnected in leaktight manner by means of a gasket 17. The bodies 11 and 12 have respective channel portions 14 and 15 defining a fluid flow duct 13 for fluid flowing in a direction E. Each of the channel portions 14 and 15 has a coupling flange to enable the valve device to be inserted in a fluid flow circuit such as a circuit for conveying cryogenic fluid in a rocket engine, for example. The top body 12 includes a cavity 18 for receiving a shutter element 40.

The shutter element 40 comprises a skirt 41 that is closed in its top portion which is extended by a shoulder (not shown) that bears against a sloping contact ball bearing 16 that takes up both axial and lateral forces. The top portion of the shutter element is connected in its center to a drive shaft 37 for turning the shutter element about an axis 38, which corresponds to the axis of symmetry of the skirt 41. In FIG. 1, the skirt 41 is frustoconical in shape. Nevertheless, the skirt could be of cylindrical or other shape as a function of the corresponding shape of the cavity 18 formed in the top body 12. The skirt 41 presents a notch 43 forming an opening in the wall thereof so as to allow fluid to flow along the duct 13. More precisely, the valve is actuated by turning the shutter element 40 between a closed position in which the skirt 41 closes off the duct 13, and an open position in which the entire notch 43 co-operates with the duct 13, thereby releasing a rectilinear flow section having very low head loss. Consequently, the notch 43 must present at least a first portion 43A that forms an opening of size equivalent to the section of the channel portion 15 so as to enable the skirt 41 to be fully retracted when the valve is in its fully-open position. In FIG. 1, the notch 43 presents a sloping right profile defining an opening that tapers progressively going away from the bottom end of the skirt 41.

One of the remarkable aspects of the device of the present invention lies in the shape of the profile of the notch 43. When the shutter element 40 is turned about its axis 38 between the closed position and the open position of the valve, the head loss in the circuit 13, and consequently the flow rate of the fluid, can be controlled as a function of the profile of the notch 43 which appears progressively in the section of the channel portion 15. As shown in FIG. 1, the notch 43 presents a rectilinear profile that makes it possible to obtain an almost linear slope for variation in head loss as a function of the angle through which the shutter element is turned. Nevertheless, the shape of the profile of the notch can be adapted as a function of the head loss relationship that is desired for the valve.

By way of example, FIG. 2 shows a shutter embodiment 50 whose skirt 51 presents a profile that is not rectilinear, so as to obtain a head loss relationship that is not linear when the shutter element is turned. The notch 53 has an edge 54 of slope that varies so as to present, in a first portion 53A of the notch, a slope that is relatively steep, whereas in a second portion 53B, the edge 54 presents a shallower slope. This makes it possible to obtain a large rise in head loss on turning the shutter element away from the fully-open position. This constitutes merely one example of a variant shape that can be obtained to satisfy some particular head loss relationship. In accordance with the invention, any other type of shape that enables a specific head loss relationship to be defined can be made. For example, it is possible to have a notch whose edge includes crenellations so as to create stepped thresholds in the variation of head loss.

Another advantageous characteristic of the shutter element of the invention is the extent over which the notch can be formed around the skirt. In order to act as a shutter, it suffices for the shutter element 40 to have a solid skirt portion of a width that corresponds to the section of the duct 13, or more specifically of a width that corresponds to the diameter of the section of the duct portion 15. Thus, in a position that is defined as being the closed position of the valve, the portion of the skirt that is left intact will completely close off the duct portion 15, thus almost completely preventing any flow of fluid therealong. Consequently, the remainder of the perimeter of the skirt 41 can be used for machining the notch. This makes it possible to obtain a flow variation profile that can be defined over a long stroke. For example, for a channel portion of section having a diameter of 25 millimeters (mm), it is possible to obtain an opening in the skirt that extends over a stroke of 270°. Nevertheless, it is possible to have openings that extend over greater strokes. In general, the maximum possible stroke that can be obtained with the shutter element of the invention is a function of the ratio between the duct section and the diameter of the shutter element.

Thus, it is possible to reduce significantly and in cost-saving manner the accuracy that is required for the actuator merely by using the shutter element specific to the invention. In particular, if the solution of the present invention which makes it possible to use strokes of up to 270° and more, is compared with conventional valves having a quarter-turn type rotary valve plug (i.e. a stroke over 90°), it can be seen that for equivalent precision in adjusting head loss, the valve device of the present invention requires much less accuracy in positioning the actuator than is required with a conventional valve. By way of example, for a valve having a slope of 250°, it is estimated that the requirement in terms of actuator accuracy is five times more relaxed (20%) than would be required for a conventional quarter-turn valve that allows control over a stroke of 50°. In other words, for given precision, the maximum error that can be accepted for an actuator coupled to a valve of the invention is 0.5° as compared with 0.1° for a conventional valve. This makes it possible to reduce the overall cost of the device considerably.

To turn the shutter element, and more particularly the skirt, about the axis 38, the drive shaft 37 is connected to an actuator 30 that is offset from the hydraulic portion of the device as defined by the valve body 10. Although the actuator described herein is an electrical actuator, other types of actuator, such as hydraulic or pneumatic rotary actuators, for example, could be used in a valve device of the invention. The actuator 30 comprises a casing 31 containing at least one electric motor 32 which transmits its drive to a gearbox 34 whose outlet is coupled to the drive shaft 37. For uses in onboard systems, such as in rocket engines, the motor 32 may be made redundant by adding an identical second motor 33. The motor(s) of the valve device of the invention is/are preferably a direct current (DC) motor with brushes, presenting in particular an ability to operate for a certain length of time in blocked torque, a high level of expansion torque to prevent the motor from being in vibration, an ability to operate outside the atmosphere or in a rarefied atmosphere, and an ability to operate with voltage pulses.

A position sensor 35 which may also be made redundant by means of a second sensor 36 is placed on the shaft 37 at the outlet from the gearbox so as to make it possible to monitor, and where appropriate servo-control, the cooling of the actuator. Because of the low speed of actuation as produced by the gearbox, which preferably has a reduction ratio of more than 200, and because of the large control stroke of the shutter element, control can be performed remotely from an onboard computer using very low levels of power, corresponding to those required by the solenoid valves normally used with rocket engines.

This provides an actuator that is slow, irreversible, and using DC motors with brushes that are suitable for being controlled without using electronics, merely by switching on a control circuit. When coupled to a valve of the invention, this type of actuator presents significant advantages, in particular in space applications, since it enables all or part of the control of a rocket engine to be performed without requiring dedicated electronics or proportional flight control.

As mentioned above, the cost of the actuator is greatly reduced because of the relaxed requirement for precision that is made possible by the hydraulic portion of the valve. This reduction in the precision required of the actuator has a direct impact on the gearbox and the position sensors, since it is possible to make use of standard gearboxes and sensors of low cost. For identical precision in adjusting head loss, a conventional valve (e.g. a quarter-turn type valve) requires positioning accuracy of the actuator of 0.1°, whereas with the device of the invention, it suffices to have positioning accuracy of 0.5°. This constitutes a significant technological advantage, particularly in cryogenic applications where obtaining control over clearances at all temperatures is problematic.

FIG. 3 shows a variant embodiment of the valve device of the invention, and also shows another embodiment of the hydraulic portion of the valve device of the invention. In FIG. 3, the device comprises a valve body 110 formed by a bottom body 111 and a top body 112 connected together in leaktight manner via a gasket 117. Unlike the duct portions 14 and 15 shown in FIG. 1 that together form an axial duct 13, the bodies 111 and 112 have respective duct portions 114 and 115 that define a duct 113 having a bend. Furthermore, the top body 112 has a cylindrical cavity 118 that receives a shutter element 140 whose skirt 141 is likewise cylindrical in shape. The skirt 141 has a notch 143 that may be of various shapes depending on the desired head loss relationship, as explained above. In accordance with the invention, the notch 143 needs to present at least one portion which forms an opening of dimension equivalent to the section of the duct 113 in order to allow the skirt 141 to be completely retracted when the valve is in its fully open position. Thus, in the open position, head losses are no more than the head losses due merely to the shape of the duct.

The valve device also comprises an actuator 130 of the same type as that described with reference to FIG. 1, and which, as shown in this figure, may include connectors 138 and 139 enabling it to be controlled.

Figure 4:
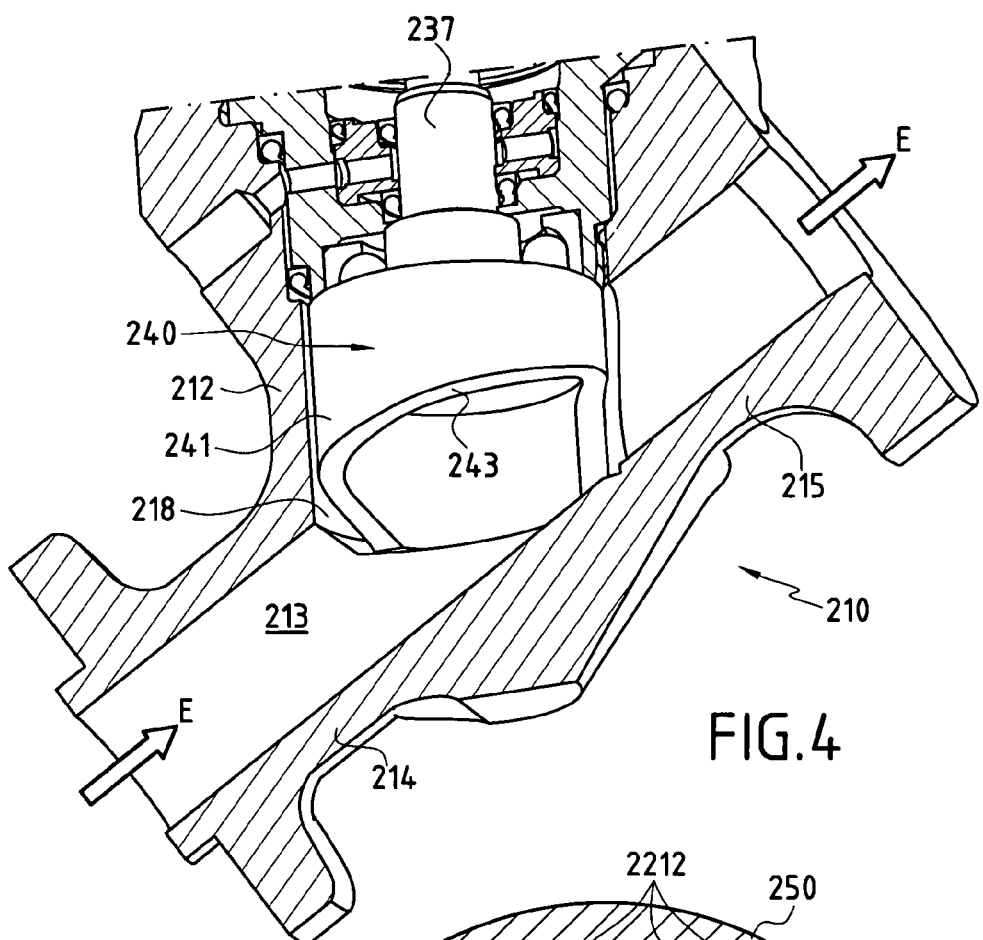
FIG. 4 is a perspective view of a third embodiment of the valve device of the invention.

FIG. 4 shows a third embodiment of the valve device of the invention. The device comprises a valve body 210 formed by two duct portions 214 and 215 defining an axial duct 213. The top body 212 includes a cylindrical cavity 218 which receives a shutter element 240 comprising a skirt 241 of cylindrical shape. The skirt 241 has a notch 243 that can present dimensions that vary as a function of the desired control stroke. In addition, the notch may present various different shapes depending on the defined head loss relationship, as explained above. In accordance with the invention, the notch 243 is dimensioned so as to enable the skirt 241 to be fully retracted from the duct when in the open position. Thus, in the open position, the duct 213 can be considered as being equivalent to a simple tube, there being no obstacle in the flow stream defined by the duct.

The shutter element 240 is connected to a drive shaft 237 which is connected to suitable actuator means such as those described above.

A valve device of the invention can have disposed therein a mechanical abutment system that is adjustable in discrete steps and that is prevented from moving by an obstacle. This is represented diagrammatically in FIG. 1 by an abutment system 20 which is formed by a moving abutment 22 coupled on the drive shaft 37, and an adjustable fixed abutment 21.

The adjustable abutment system where movement is prevented by means of an obstacle is based on a principle of providing holes at different pitches, as described in detail below with reference to FIGS. 3, 5, and 6. The abutment system 120 shown with the embodiment of FIG. 3 could likewise be implemented in the same way with the valve device of FIG. 1 or FIG. 4.

As shown in FIG. 3, the abutment system 120 is disposed between the valve body 110 which constitutes the hydraulic portion of the valve device, and the actuator 130. More precisely, in FIG. 5, the top portion of the drive shaft 137 is provided with a moving abutment 122 constituted by a sleeve 1221 and a finger 1222. The sleeve 1221 is coupled to the shaft 137 by a key 139 which co-operates with a first groove 1371 formed in the shaft and a second groove 1223 machined in the sleeve 1221. The sleeve may be secured to the drive shaft by any other equivalent device.

The finger 1222 of the moving abutment 122 comes into abutment against a stud 1211 of a ring 121 which is positioned around the shaft 137. On one side, the ring 121 is in contact with a flange 150 of the valve body, and on the other side with the casing 131 of the actuator 130. To enable the actuator to transmit the rotation produced by the motor to the drive shaft, the casing 131 of the actuator includes a hole 1312 which co-operates with a connection peg 126 fixed on the flange 150.

Figure 6:
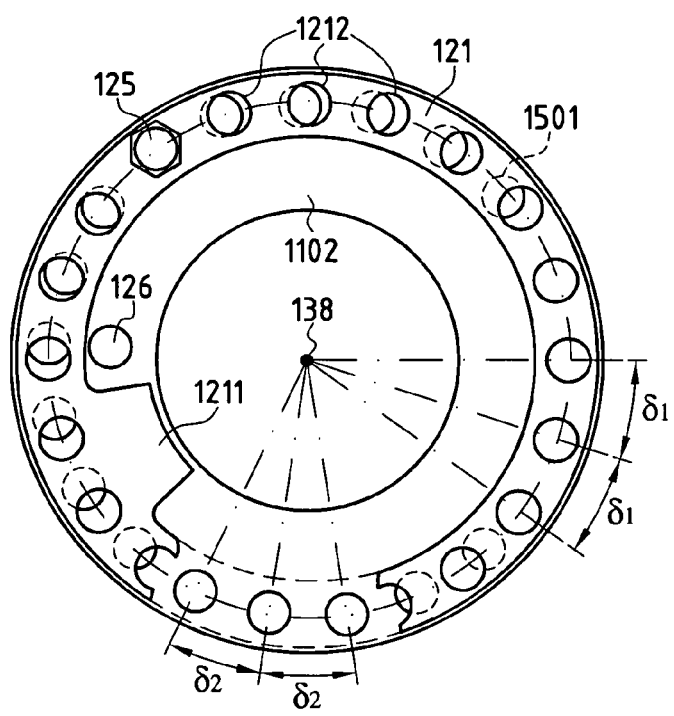
FIG. 6 is a diagrammatic section view showing how the FIG. 5 abutment system is positioned.

Holes 1501 are drilled at a constant angular interval in the flange 150 to define an angular pitch δ2 (FIG. 6). Similarly, holes 1212 distributed uniformly at an angular pitch δ1 (FIG. 6) are machined in the ring 121. The holes 1501 and 1212 are drilled around the same circumference relative to the axis of rotation 138. Since each series of holes is machined at a constant angular pitch δ1 or δ2, the resolution R with which the abutment can be adjusted is then defined by the following relationship:

$$R=(\delta 2-\delta 1)$$

The number of holes required can then be defined by the following relationships:

$$N1=360/\delta 1 \text{ and } N2=(\delta 1/2R)-1$$

providing that N2=360/δ2, and as a function of the desired adjustment range, and with the following notation:
N1: number of holes in the ring;
N2: number of holes in the flange of the top body;
R: adjustment resolution (in degrees);
δ1: angular pitch of the holes N1 (in degrees); and
δ2: angular pitch of the holes N2 (in degrees).

By way of example, if the flange of the valve body has 17 holes (N2) each offset at a pitch of 17°, and the ring has 20 holes (N1) offset at a pitch of 18°, then adjustment resolution R is 1° and the rotary stroke can be adjusted with precision of ±0.5°.

Abutment is adjusted by positioning the ring 121 on the flange 150 and preventing it from turning relative thereto by means of a stop pin 125 of bolt or other type inserted in two facing holes. Since the holes are situated outside the casing 131 of the actuator, the operation of adjusting abutment by positioning the ring can be performed without removing the actuator. A nut 127 (FIG. 3) can be provided for tightening this ring portion 121.

Figure 7:
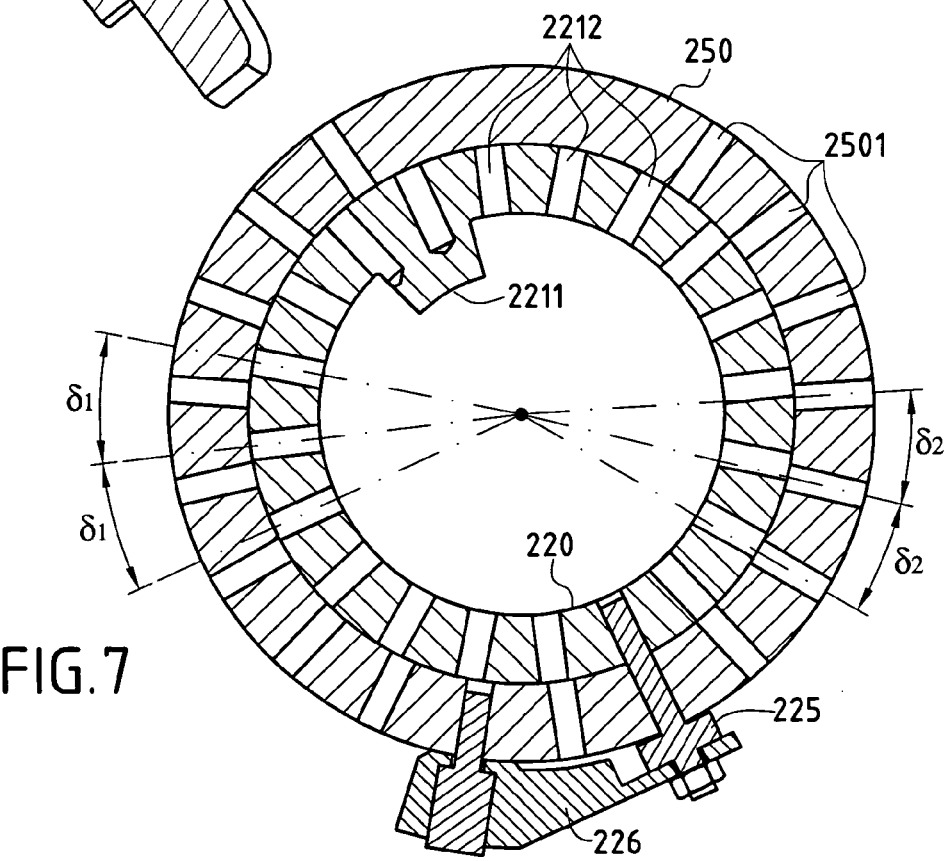
FIG. 7 is a diagrammatic section view showing a variant embodiment of the adjustable abutment system in accordance with the invention.
Figure 5:
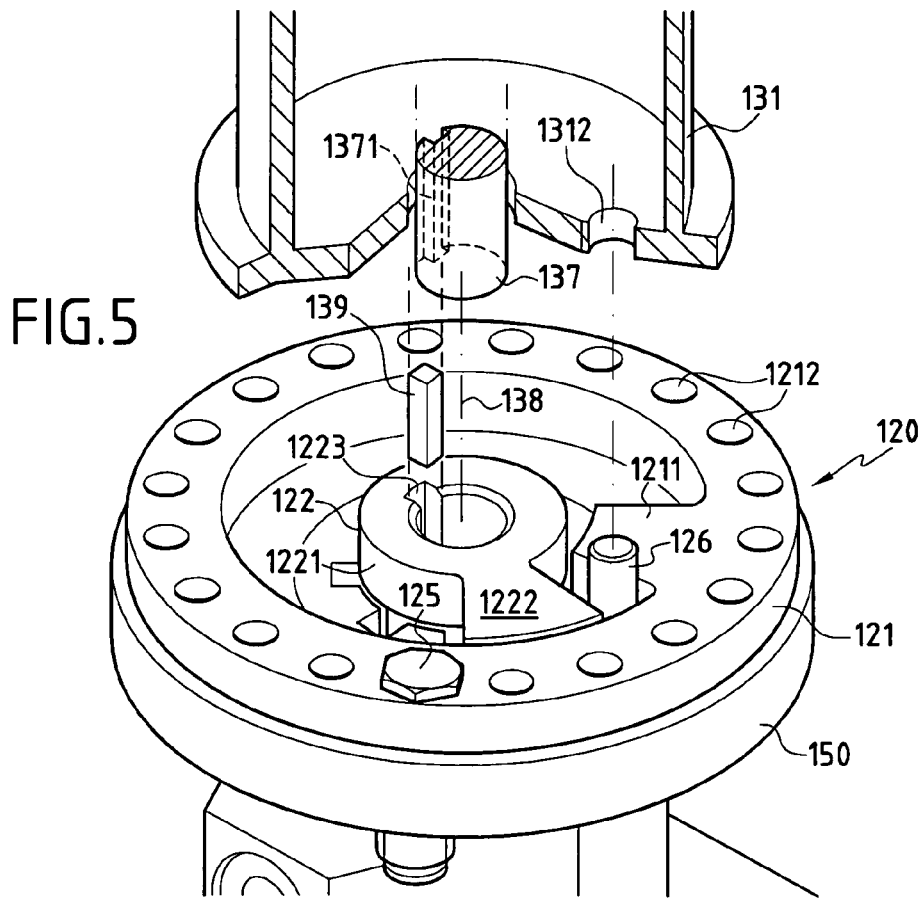
FIG. 5 is an exploded perspective view of an adjustable abutment system of the valve device of the invention.

FIG. 7 shows an abutment system similar to that shown in FIGS. 5 and 6, but in which abutment is adjusted in the radial plane. For this purpose, the abutment system comprises a ring 220 provided with a stud 2211 which is positioned on a flange 250. The ring 220 and the flange 250 have respective series of holes 2212 and 2501 that are drilled radially around the outline of the ring and the flange. The series of holes 2212 defines a first angular pitch δ1, while the series of holes 2501 defines a second angular pitch δ2. The resolution and the number of holes required for adjusting the abutment are determined by using the relationship defined above for the abutment system shown in FIG. 6. The positioning of the ring 220 on the flange 250 and the locking of its position are performed by means of a pin 225 inserted in two facing holes. The pin 225 is held in place by a locking element 226 which engages in one of the adjacent holes in the flange.

The valve device of the invention thus makes it possible to provide a high-performance control valve at low cost, in particular because of the special structure of the shutter element which makes it possible to use a large control stroke, thereby making it possible to reduce the precision required of the actuator. The ease with which the profile of the notch in the shutter element can be modified also makes it possible to adapt to a multiplicity of control relationships, including relationships with non-linear variations. This element is also advantageous because it does not lead to transformation of movement in the fluid as is the case with linear valves having a pinion or a rack.

Furthermore, the device of the invention can include a mechanical abutment that is adjustable in discrete manner that is easy to manufacture and to handle.

The valve device of the invention presents other advantages when used in a rocket engine. It makes it possible to use on/off control with the pneumatic control sequences that are normally in use, and with stopping taking place against a previously-adjusted mechanical abutment. It also enables the rocket engine to be controlled using an open-loop system applying valve position relationships that are preprogrammed, or else it enables the engine to be controlled in a closed loop by acting on valves with or without a reference position.

These features can be obtained with the same device both on the ground and in flight.

By using inexpensive technologies, the valve device of the invention provides economic savings compared with corresponding pneumatic devices, even though they perform an on/off function only, while still making it possible to avoid using an associated solenoid valve. The device of the invention does not lead to extra cost for integration in a launcher since it is suitable for use with the pre-existing electrical system without requiring additional components.

What is claimed is:

1. A control valve device comprising a valve body defining a fluid flow duct in which a shutter element is disposed that is turned by actuator means via a drive shaft, wherein the shutter element is a hollow body formed of a surrounding wall closed at a top portion that is connected to the drive shaft and open at a bottom portion that is larger in dimension than the top portion, the surrounding wall having a notch, the notch providing a sloping profile defining an opening that tapers progressively going away from the bottom portion of the surrounding wall, the notch being profiled so as to define a variable flow section in the duct as a function of the angular position of said shutter element between a closed position in which the bottom portion of the hollow body closes off the duct and an open position in which the bottom portion of the hollow body is fully retracted from the fluid flow duct so as to allow the fluid to flow freely in the duct.

2. A valve device according to claim 1. wherein the skirt of shutter element is frustoconical in shape.

3. A valve device according to claim 1, wherein the skirt of the shutter element is cylindrical in shape.

4. A valve device according to claim 1, wherein the notch presents a right profile which defines an opening that tapers until it meets the bottom end of the skirt.

5. A valve device according to claim 1, wherein the notch presents a profile that is a function of the desired head loss relationship.

6. A valve device according to claim 1, wherein the notch extends around the skirt of the shutter element over an angle of up to 270°.

7. A valve device according to claim 1, wherein the actuator means comprise at least one electric motor and a gearbox whose outlet is coupled to the drive shaft.

8. A valve device according to claim 7, wherein the electric motor is irreversible.

9. A valve device according to claim 7, wherein the actuator means further includes at least one position sensor.

10. A valve device according to claim 7, wherein the actuator means further includes a redundant second electric motor.

11. A valve device according to claim 1, including an adjustable mechanical abutment system formed by a moving abutment secured to the drive shaft and a stationary abutment that is adjustable on the valve body.

12. A valve device according to claim 11, wherein the stationary abutment comprises a ring having a stud, said ring being adjustable in position on a flange of the valve body.

13. A valve device according to claim 12, wherein the ring includes a first plurality of holes uniformly spaced apart at a first angular interval, and wherein the flange of the valve body includes a second plurality of holes uniformly spaced apart at a second angular interval, the abutment being adjusted by locking the ring to the flange by means of a stop pin.

14. A valve device according to claim 13, wherein the first and second pluralities of holes are pierced in the radial plane of the ring and of the flange, respectively.

* * * * *